(12) United States Patent
Kumar et al.

(10) Patent No.: US 11,164,187 B1
(45) Date of Patent: Nov. 2, 2021

(54) APPARATUS AND METHOD FOR ROLLING PAYMENT

(71) Applicant: CSG Systems, Inc., Greenwood Village, CO (US)

(72) Inventors: Anshul Kumar, Naperville, IL (US); Ethan Gery, La Grange, IL (US)

(73) Assignee: CSG Systems, Inc., Greenwood Village, CO (US)

( * ) Notice: Subject to any disclaimer, the term of this patent is extended or adjusted under 35 U.S.C. 154(b) by 0 days.

(21) Appl. No.: 17/166,140

(22) Filed: Feb. 3, 2021

(51) Int. Cl.
*G06Q 20/40* (2012.01)
*G06Q 20/38* (2012.01)
*G06Q 20/22* (2012.01)

(52) U.S. Cl.
CPC ......... *G06Q 20/405* (2013.01); *G06Q 20/227* (2013.01); *G06Q 20/382* (2013.01); *G06Q 20/401* (2013.01)

(58) Field of Classification Search
None
See application file for complete search history.

(56) References Cited

U.S. PATENT DOCUMENTS

| 6,327,348 | B1 | 12/2001 | Walker |
| 7,617,972 | B2 | 11/2009 | Hogg |
| 8,352,315 | B2 | 1/2013 | Faith |
| 8,401,970 | B1 | 3/2013 | Patel |
| 8,490,869 | B2 | 7/2013 | Brown |
| 8,622,292 | B2 | 1/2014 | Katz |
| 8,820,633 | B2 | 9/2014 | Bishop |
| 9,633,352 | B2 | 4/2017 | Henderson |
| 2002/0103753 | A1 | 8/2002 | Schimmel |
| 2007/0106606 | A1 | 5/2007 | Pankratz |
| 2007/0192245 | A1 | 8/2007 | Fisher |

OTHER PUBLICATIONS

Gil Levy; "Why Merchants are Chasing Splitit: How Splitit uses Credit Card Authorization Holds"; Splitit; May 15, 2019; https://www.splitit.com/blog/why-merchants-are-chasing-splitit-how-splitit-uses-credit-card-authorization-holds/; 8 pages.

*Primary Examiner* — Jamie R Kucab
*Assistant Examiner* — Nicholas K Phan
(74) *Attorney, Agent, or Firm* — Fitch, Even, Tabin & Flannery LLP (57) ABSTRACT

A rolling electronic payment reservation and reservation system is provided. In aspects, reservations and payment capture for different items on a credit card (or other payment instrument) are split based on the type of item, and rolling, multiple credit reservations are made for different items on the same, single order.

29 Claims, 5 Drawing Sheets

APPARATUS AND METHOD FOR ROLLING PAYMENT

TECHNICAL FIELD

This patent relates to a rolling payment and payment reservation system.

BACKGROUND

Various types of purchases are made that utilize a payment instrument such as a credit card. A variety of types of purchases for different types of products can be made in this way.

In the telecommunication field, different parts and services are often ordered at the same time. For example, a modem, an electronic subscriber identification module (SIM) card, and a phone case may be ordered at the same time. A customer may use a credit card (or other payment instrument) to pay for their purchases.

Typically, when a purchase is made, a "reservation" is made on the credit card, and then the entire payment capture for the purchase occurs. For example, when a credit card is charged for $100, a reservation or hold of $100 is applied against the credit limit on the card, and immediately thereafter payment capture of the entire $100 occurs. Payment capture, in aspects, may involve the actual electronic transfer of funds.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The invention relates to a rolling payment reservation system. In aspects, the invention splits reservations and payment capture for different items on a credit card (or other payment instrument) based on the type of item, and executes rolling, multiple credit "reservations" for different items (or services) on the same, single order.

Other aspects of the invention include the ability to analyze historic data and automatically initiate reservations before an event is predicted to occur. For example, if shipments historically occur three days after an order is reserved, a reservation can be made automatically three days after the order is received. In another example and based upon historic data, reservations can also be cancelled. For example, if a shipment does not occur within the predicted 3 days, then a reservation for a product that includes payment capture when the product is shipped may be cancelled, thereby freeing credit on the credit card (and increasing the amount of credit that is available).

In many of these embodiments, a system includes a user electronic device, an electronic memory device, and a control circuit. The user electronic device is configured to accept a customer order, and the customer order includes a first item and a second item. The electronic memory device stores a policy, and the policy maps item types to triggering events.

The control circuit is coupled to the user electronic device and the electronic memory device. The control circuit is configured to: receive the order from the customer via the user electronic device; parse the order to determine the first item and the second item, and determine a first item type for the first item and a second item type for the second item; determine a first triggering event for the first item type and a second triggering event for the second item type by applying the first item type and the second item type to the policy; and subsequent to receipt of the order, send a first authorization request to a financial institution, the first authorization request including an initial amount, the initial amount including a cost of the first item and a cost of the second item, and subsequently receive a first authorization from the financial institution for the first amount and the second amount, the first authorization including a first authorization identifier.

The control circuit is configured to, subsequent to receiving the first authorization, monitor for the occurrence of the first triggering event and upon the occurrence of the first triggering event send a first capture request to the financial institution to capture the funds for the first item, close the first authorization, and send a second authorization request to the financial institution. The second authorization request is for the initial amount minus the cost of the first item.

The control circuit is configured to, when the financial institution approves the second authorization request receive a second authorization. The second authorization includes a second authorization identifier and includes the cost of the second item.

The control circuit is configured to subsequently monitor for the occurrence of the second triggering event and upon the occurrence of the second triggering event send a second capture request to the financial institution to capture the funds for the second item, and close the second authorization.

One or more actions occur after the order is received. Examples of the one or more actions include: shipment of a product from a storage site causes a first electronic signal to be sent to the control circuit, the first electronic signal indicating the shipment has occurred; download of digital content or computer software from an electronic memory storage device causes a second electronic signal to be sent to the control circuit, the second electronic signal indicating the download has occurred; activation of a service on an electronic communication network causes a third electronic signal to be sent to the control circuit from the electronic communication network; usage of a service on the electronic communication network causes a fourth electronic signal to be sent to the control circuit from the electronic communication network; or when a failure notice is received from the financial institution, the control circuit sends a fifth electronic signal effective to deactivate an electronic device or service on the electronic communication network. Other examples of actions are possible.

In some examples, the occurrence of the triggering event is random and unpredictable in time. In other examples, occurrence of the triggering event is predetermined in time.

In some aspects, the user electronic device is a laptop, personal computer, smartphone, or tablet. Other examples of devices are possible.

In some other examples, when the financial institution rejects the second authorization request, the failure notice is received from the financial institution.

In other aspects, historical data is analyzed by the control circuit and automatically used to selectively initiate authorization requests before a predetermined triggering event occurs. In other aspects, historical data is analyzed by the control circuit and an authorization request is selectively cancelled.

In other examples, the order includes one or more of an order for an electronic device or an order for a service.

In some examples, the electronic device is a sensor. In some other examples, the electronic device is an Internet of Things (IoT) device. Other examples of electronic devices are possible.

In still other examples, the policy is dynamic and can be changed over time. In yet other examples, the policy is static and does not change over time.

In others of these embodiments, a user electronic device is provided. The user electronic device is configured to accept a customer order, and the customer order includes a first item and a second item.

An electronic memory device is provided. The electronic memory device stores a policy, and the policy maps item types to triggering events.

At a control circuit, the order is received from the customer via the user electronic device. At the control circuit, the order is parsed to determine the first item and the second item. A determination is made of a first item type for the first item and a second item type for the second item.

At the control circuit, a first triggering event is determined for the first item type and a second triggering event is determined for the second item type by applying the first item type and the second item type to the policy.

At the control circuit and subsequent to receipt of the order, a first authorization request is sent to a financial institution. The first authorization request includes an initial amount, and the initial amount includes a cost of the first item and a cost of the second item. Subsequently a first authorization is received from the financial institution for the first amount and the second amount, and the first authorization includes a first authorization identifier.

At the control circuit and subsequent to receiving the first authorization, monitoring for the occurrence of the first triggering event occurs, and upon the detection of the occurrence of the first triggering event, a first capture request is sent to the financial institution to capture the funds for the first item; the first authorization is closed; and a second authorization request is sent to the financial institution. The second authorization request is for the initial amount minus the cost of the first item.

At the control circuit and when the financial institution approves the second authorization request, a second authorization is received. The second authorization includes a second authorization identifier and includes the cost of the second item.

The control circuit subsequently monitors for the occurrence of the second triggering event and upon the detection of the occurrence of the second triggering event, a second capture request is sent to the financial institution to capture the funds for the second item and the second authorization is closed.

One or more actions occur after the order is received. Examples of the one or more actions include: shipment of a product from a storage site causes a first electronic signal to be sent to the control circuit, the first electronic signal indicating the shipment has occurred; download of digital content or computer software from an electronic memory storage device causes a second electronic signal to be sent to the control circuit, the second electronic signal indicating the download has occurred; activation of a service on an electronic communication network causes a third electronic signal to be sent to the control circuit from the electronic communication network; usage of a service on the electronic communication network causes a fourth electronic signal to be sent to the control circuit from the electronic communication network; or when a failure notice is received from the financial institution, the control circuit sends a fifth electronic signal effective to deactivate an electronic device or service on the electronic communication network. Other examples of actions are possible.

In others of these embodiments, a system includes a user electronic device, an electronic memory device, and a control circuit.

The user electronic device is configured to accept a customer order, and the customer order includes a plurality of items. The electronic memory device stores a policy, and the policy maps item types to triggering events.

The control circuit is coupled to the user electronic device and the electronic memory device. The control circuit is configured to receive the order from the customer via the user electronic device and parse the order to determine each of the plurality of items in the order.

The control circuit is further configured to upon receipt of the order, send an initial authorization request to the financial institution, the initial authorization request having a total initial authorization amount that includes a cost of all items in the order, and responsively receive an initial authorization with an initial authorization identifier.

The control circuit is configured to, for each of the plurality of items in the order, determine a type for each of the items. The control circuit is also configured to, for each of the plurality of items in the order, determine a triggering event by applying the determined type of item to the policy.

The control circuit is configured to subsequently monitor for the occurrence of each of the determined triggering events. Upon detection of the occurrence of each of the determined triggering events associated with each item in the order, the control circuit is configured to send a request to the financial institution to capture the cost for the item associated with the triggering event, and when the financial institution approves the capture request, close any existing authorization associated with the order; send a subsequent authorization request to the financial institution, the subsequent authorization request having a subsequent authorization amount that excludes a cost of the item associated with the triggering event; and when the financial institution approves the subsequent authorization request, receive a subsequent authorization identifier in response to the subsequent authorization request.

One or more actions occur after the order is received. Examples of the one or more actions include: shipment of a product from a storage site causes a first electronic signal to be sent to the control circuit, the first electronic signal indicating the shipment has occurred; download of digital content or computer software from an electronic memory storage device causes a second electronic signal to be sent to the control circuit, the second electronic signal indicating the download has occurred; activation of a service on an electronic communication network causes a third electronic signal to be sent to the control circuit from the electronic communication network; usage of a service on the electronic communication network causes a fourth electronic signal to be sent to the control circuit from the electronic communication network; or when a failure notice is received from the financial institution, the control circuit sends a fifth electronic signal effective to deactivate an electronic device or service on the electronic communication network. Other examples of actions are possible.

In some examples, occurrence of the triggering event is random and unpredictable in time. In other examples, occurrence of the triggering event is predetermined in time.

In some aspects, historical data is analyzed by the control circuit and automatically used to selectively initiate authorization requests before a predetermined triggering event occurs. In other aspects, historical data is analyzed by the control circuit and an authorization request is selectively cancelled.

In some examples, the electronic device is a sensor. In other examples, the electronic device is an Internet of Things (IoT) device. Other examples are possible.

In others of these embodiments, a system includes a user electronic device, an electronic memory device, and a control circuit. The user electronic device is configured to accept a customer order and the customer order includes a first item and a second item. The electronic memory device stores a policy, and the policy maps item types to triggering events.

The control circuit is coupled to the user electronic device and the electronic memory device. The control circuit is configured to receive the order from the customer via the user electronic device; parse the order to determine the first item and the second item, and determine a first item type for the first item and a second item type for the second item; determine a first triggering event for the first item type and a second triggering event for the second item type by applying the first item type and the second item type to the policy; subsequent to receipt of the order, send a first authorization request to a financial institution, the first authorization request including an initial amount, the initial amount including a cost of the first item and a cost of the second item, and subsequently receiving a first authorization from the financial institution for the first amount and the second amount. The first authorization includes a first authorization identifier.

The control circuit is configured to, subsequent to receiving the first authorization, monitor for the occurrence of the first triggering event and upon the occurrence of the first triggering event: send a first capture request to the financial institution to capture the funds for the first item; close the first authorization; and send a second authorization request to the financial institution. The second authorization request is for the initial amount minus the cost of the first item.

The control circuit is configured to, when the financial institution approves the second authorization request receive a second authorization. The second authorization includes a second authorization identifier and includes the cost of the second item.

The control circuit is configured to subsequently monitor for the occurrence of the second triggering event and upon the occurrence of the second triggering event send a second capture request to the financial institution to capture the funds for the second item and close the second authorization.

The control circuit is configured to, when the financial institution rejects the second authorization request, receive a failure notice from the financial institution.

One or more actions occur after the order is received. Examples of the one or more actions include: shipment of a product from a storage site causes a first electronic signal to be sent to the control circuit, the first electronic signal indicating the shipment has occurred; download of digital content or computer software from an electronic memory storage device causes a second electronic signal to be sent to the control circuit, the second electronic signal indicating the download has occurred; activation of a service on an electronic communication network causes a third electronic signal to be sent to the control circuit from the electronic communication network; usage of a service on the electronic communication network causes a fourth electronic signal to be sent to the control circuit from the electronic communication network; or when a failure notice is received from the financial institution, the control circuit sends a fifth electronic signal effective to deactivate an electronic device or service on the electronic communication network. Other examples of actions are possible.

Figure 1:
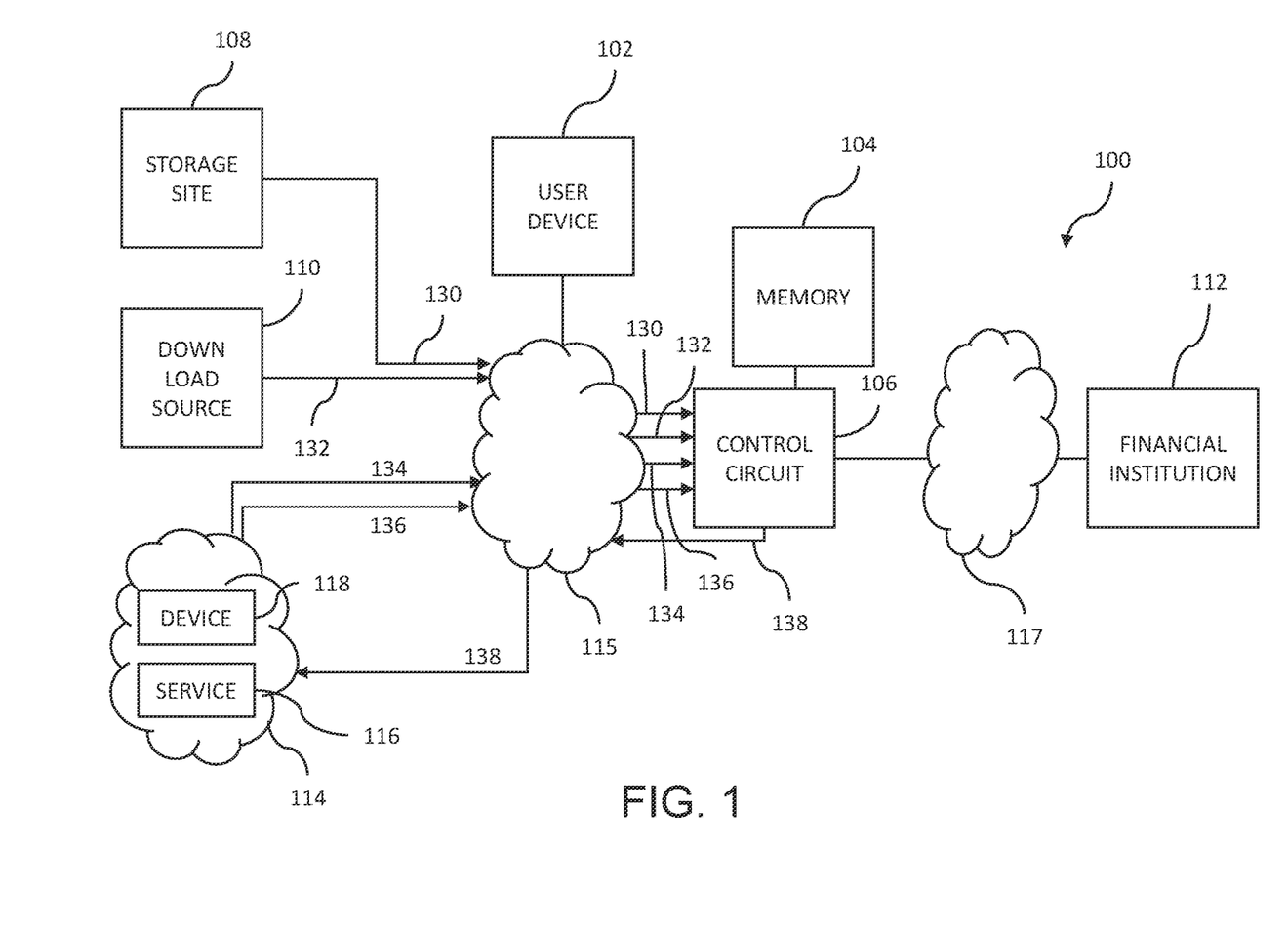
FIG. 1 comprises a diagram of a system according to various embodiments of the present invention.

Referring now to FIG. 1, one example of a system 100 for making electronic payments is described.

The system 100 includes a user electronic device 102, an electronic memory device 104, and a control circuit 106. The system 100 also includes a storage site 108, a download source 110, a financial institution 112, and an electronic communication network 114, which can activate a service 116 and a device 118. Network 115 couples to the storage site 108, download source 110, and network 114 and allows communication between the control circuit 106 and the storage site 108, download source 110, and network 114. In some examples, the network 114 and network 115 are the same, but are shown here as being distinct for purposes of clarity. The network 117 couples the control circuit 106 to the financial institution.

The user electronic device 102 is any type of user device that has an interface where the interface is used to communicate with the user and/or the user can communicate with others. In example, the user electronic device 102 is tablet, a smart phone, a cellular phone, a personal computer, or a laptop computer. Other examples of user electronic devices are possible.

The storage site 108 may be a warehouse, retail store, distribution center or any storage facility that stores physical products. The products are moved in and out of the storage site 108. The storage site 108 may include shelving, containers, or other structures for storage of the products. Movement of the products in to, out of, and within the storage site 108 may be accomplished by automated vehicles, semi-automated vehicles, manually operated vehicles, robots, conveyor belts, and/or human employees. Trucks may deliver items from the storage site 108 and/or remove items from the storage site 108. Other examples are possible.

Download source 110 is a source of electronic software. The download source 110 may include a processing device (e.g., a microprocessor or similar device or devices) and/or an electronic memory device. The download source 110 may also include transmission circuit that allows the electronic software to be transmitted, for example, to or across an electronic network. The electronic software may be any type of computer program (e.g., executable computer instructions), application, set of instructions, or combinations of these items. In one example, the electronic software may be a computer app. The electronic software may include data structures, but is not necessarily limited to being only a data structure.

The financial institution 112 may any type of financial institution such as a bank, credit union, credit card company, loan agency, retail store, or any other type of financial (or the type of) organization. The financial institution 112 includes a variety of electronic devices, electronic memory storage devices, and other equipment to process, handle, store, analyze, and/or evaluate financial transactions. For example, the financial institution 112 may be a credit card company. The credit card company has computers that receive and process credit card transactions; electronic memory storage devices that store information about credit card holders; and electronic communication equipment that couples to phone, internet, or other electronic networks to communicate with the user electronic device 102, the control circuit 106, and other users, devices, entities, or institutions.

Electronic communication networks 115 and 117 are any type of communication network (or combinations of networks). In examples, the networks 115 and 117 may be wide area networks, cellular networks, wireless networks, data networks, or the internet (or combinations of these and other networks). The networks 115 and 117 include various devices that are physically configurable such as routers, gateways, control circuits, to mention a few examples.

Electronic communication network 114 is any type of communication network (or combinations of networks), which can be utilized to activate (or in some cases deactivate) a service 116 and a device 118. The service 116 may be provided to a customer and the device 118 may be operated, owned and/or controlled by a customer. In examples, the network 114 may be a wide area network, a cellar network, a wireless network, a data network, or the internet (or combinations of these and other networks). The network 114 includes various devices that are physically configurable such as routers, gateways, control circuits, to mention a few examples.

The service 116 may supply various features to customers. In these regards, the service 116 itself is implemented, in examples, by computer instructions that actuate, de-actuate, or otherwise physical hardware elements of the network 114 (or other networks, databases, or processing elements). For example, the service 116 may be a cellular service, a voicemail service, or a data processing service to mention a few examples.

The device 118 may be an electronic user device that is coupled (electronically) to the network 114. In examples, the device 118 may be a smart phone, a cellular phone, a personal computer, a lap top, or a tablet. In some examples, the electronic device is a sensor. In other examples, the electronic device is an Internet of Things (IoT) device. Other examples of devices are possible. If an IoT device, the device 118 may include a processing device and the device 118 may be an industrial device, medical device, device in a vehicle, or a customer home device (e.g., an appliance such as a refrigerator, toaster, or oven) to mention a few examples. Other examples of IoT devices are possible.

The electronic memory storage device 104 is anytime of electronic memory storage device. The device 104 can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the device 104 may incorporate electronic, magnetic, optical, and/or other types of storage media. The device 104 can also have a distributed architecture, where various components are situated remotely from one another, but can be accessed by the processor.

The policy is stored in the electronic memory storage device 104. The policy may be of any data structure or format such as a mapping table. The policy, in some aspects, may include executable code. The policy maps item or services types to triggering events. The types may be more general or very specific types. In one example, one type might be "telecommunication device equipment." In other examples, the types might include "phone cases," "connection cords," "smartphones," and "screen protectors." Events could include ordering, shipment, activation, or deactivation. As described elsewhere herein, the approaches herein parse an order to determine the type of item(s) that are being ordered, and these are mapped to triggering events. Once the mapping has occurred, these approaches can monitor for the specific triggering events using sensors to monitor for the receipt of electronic signals that indicate a triggering event has occurred.

In other examples, the policy is dynamic and can be changed over time. For example, an administrator can change item types and triggering events in a mapping table based upon an analysis of historic customer purchase data or trends in the marketplace.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 106 may be configured (for example, by using corresponding programming stored in a memory as will be well understood by those skilled in the art) to carry out one or more of the steps, actions, and/or functions described herein. The control circuit 106 may include a memory that includes computer instructions that implement any of the functions described herein.

In one example of the operation of the system of FIG. 1, the control circuit 106 receives the order from the customer via the user electronic device 102; parses the order to determine the first item and the second item and determines a first item type for the first item and a second item type for the second item; determines a first triggering event for the first item type and a second triggering event for the second item type by applying the first item type and the second item type to the policy. In some examples, the occurrence of the triggering event is random and unpredictable in time. In other examples, occurrence of the triggering event is pre-determined in time. To take one example, an actuation event (where the customer presses a key on a device) may occur randomly in time (there is no way to know when this event would occur). On the other hand, a shipment event may be predictable in time (e.g., 3 days after an order is placed).

The order specifies items or services the customer wishes to purchase (in this example, the first item and the second item). It will be appreciated that in this example there are only two items, but that any number of items can be included in the order. The order may be an electronic order and filled in or entered by the customer at the electronic device 102 (such as a smart phone or personal computer using a user interface at the device).

The control circuit 106, subsequent to receipt of the order, sends a first authorization request to a financial institution 112. The first authorization request includes an initial amount (e.g., in monetary units such as dollars), and the initial amount includes a cost of the first item and a cost of the second item. The control circuit 106 subsequently receives a first authorization from the financial institution 112 for the first amount and the second amount. The first authorization includes a first authorization identifier. The first authorization identifier and other authorization identifiers can be any type of identifier (e.g., any type of alpha numeric identifier). The first authorization indicates that the financial institution approves the request.

By "authorization" and as used herein, it is meant that a certain amount of funds are reserved against a particular customer's account. For example, a customer might have a credit limit of $1000, and then an authorization (reservation) request is made for $100. The financial institution 112 determines whether to grant the authorization request by comparing the requested amount ($100) to the limit ($1000) and finds that there is some amount ($900) left over. Because of this determination, then the financial institution 112 can grant or approve the request. The financial institution 112 sends an authorization to the control circuit 106 indicating approval and also including an identifier.

On the other hand, a customer might have a credit limit of $1000, and then an authorization (reservation) request is made for $1200. The financial institution 112 determines whether to grant the authorization request by comparing the requested amount ($1200) to the limit ($1000) and finds that there is nothing left over, in fact there is a deficit ($200) between the amount requested and the credit limit. In this case, the financial institution 112 may deny the request and issue a failure notice. The authorization request is an electronic communication message.

The control circuit 106, subsequent to receiving the first authorization, monitors for the occurrence of the first triggering event. Monitoring may include monitoring for electronic communications where the electronic communications indicate a particular triggering event has occurred. In one example, control or other types of electronic signals are received. In aspects, the control signals may indicate a shipping event has occurred (e.g., an item has been physically shipped), a service or device has been actuated (the control signal includes information that indicates an activation of a particular device has occurred), or that a device or service has been deactivated. It will be appreciated that actuation and deactivation of devices or services necessarily involves electronic hardware components of these devices being activated, deactivated, or both. Monitoring may also include utilizing sensors for monitoring of different events, occurrences, or situations.

Various examples of triggering events are possible. For example, a shipment of an item, the activation of a service, the actuation of a key on a keyboard of a customer, or receipt of the order may be triggering events. Other examples of triggering events are possible. The events involve physical actions and may be sensed by different types of sensors or sensing arrangements.

The authorizations (i.e., created by the financial institution 112 upon granting an authorization request) described herein may be of any format, protocol, and/or data structure. For example, an electronic message including the requested amount and an identifier that identifies the customer, and/or an authorization identifier (to uniquely identify the transaction including potentially the customer).

Upon detection of the occurrence of the first triggering event, the control circuit 106 sends a first capture request to the financial institution 112 to capture the funds for the first item; closes the first authorization; and sends a second authorization request to the financial institution 112. The second authorization request is for the initial amount minus the cost of the first item. By "capture," it is meant the actual physical (e.g., electronic) transfer or (electronic) movement of funds according to a set of rules or procedures whereby the funds are moved from one entity to another entity (e.g., from the customer's bank to the credit card company in one example). By "close" or "closing," it is meant that the authorization is subsequently ignored and not utilized.

The control circuit 106 is configured to, when the financial institution 112 approves the second authorization request, receive a second authorization. The second authorization includes a second authorization identifier and also includes the cost of the second item.

The control circuit 106 is configured to subsequently monitor for the occurrence of the second triggering event and upon detection of the occurrence of the second triggering event send a second capture request to the financial institution to capture the funds for the second item, and close the second authorization.

As mentioned, one or more actions occur after the order is received. In one example, shipment of a product from the storage site 108 causes a first electronic signal 130 to be sent to the control circuit 106. The first electronic signal 130 indicates the shipment has occurred.

In another example, downloading of digital content or computer software from the download source 110 causes a second electronic signal 132 to be sent to the control circuit 106. The second electronic signal 132 indicates the download has occurred.

In yet another example, activation of the device 118 or the service 116 on an electronic communication network 114 causes a third electronic signal 134 to be sent to the control circuit from the electronic communication network 114.

In still another example, usage of the device 118 or service 116 on the electronic communication network 114 causes a fourth electronic signal 136 to be sent to the control circuit from the electronic communication network 114.

In yet another example, when a failure notice is received from the financial institution 112, the control circuit 106 sends a fifth electronic signal 138 that is effective to deactivate the electronic device 118 or service 116 on the electronic communication network 114. In these cases, when the financial institution 112 rejects the second authorization request, the financial institution 112 creates the failure notice, and then the failure notice is received by the control circuit 106 from the financial institution 112.

The electronic signals described herein can be formatted as individual signals, data, messages, and/or instructions that follow any appropriate protocol. For example, the signals may be messages that incorporate information or data that represents or indicates shipment or downloading of software has occurred. in other examples, the signals may be messages that incorporate information or data that represents or indicates a key on the device 118 has been pressed or the device 118 has been actuated.

In another example of the operation of the system of FIG. 1, the control circuit 106 is configured to receive the order from the customer via the user electronic device 102 and parse the order to determine each of the plurality of items in the order.

The control circuit 106 is further configured to upon receipt of the order, send an initial authorization request to the financial institution 112. The initial authorization request has a total initial authorization amount that includes a cost of all items in the order. The control circuit 106 is configured to responsively receive an initial authorization with an initial authorization identifier.

The control circuit 106 is configured to, for each of the plurality of items in the order, determine a type for each of the items. The control circuit 106 is configured to, for each of the plurality of items in the order, determine a triggering event by applying the determined type of item to the policy.

The control circuit 106 is configured to subsequently monitor for the occurrence of each of the determined triggering events. Upon detection of the occurrence of each of the determined triggering events associated with each item in the order, the control circuit 106 is configured to send a request to the financial institution 112 to capture the cost for the item associated with the triggering event, and when the financial institution 112 approves the capture request, close any existing authorization associated with the order; send a subsequent authorization request to the financial institution. The subsequent authorization request has a subsequent authorization amount that excludes a cost of the item associated with the triggering event. When the financial institution approves the subsequent authorization request, the control circuit 106 is configured to receive a subsequent authorization identifier in response to the subsequent authorization request.

One or more actions occur after the order is received. In one example, shipment of a product from a storage site 108 causes a first electronic signal 130 to be sent to the control circuit 106. The first electronic signal indicates the shipment has occurred.

In another example, downloading of digital content or computer software from the download source 110 causes a second electronic signal 132 to be sent to the control circuit 106. The second electronic signal 132 indicates the shipment has occurred.

In yet another example, activation of a service 116 or device 118 on an electronic communication network 114 causes a third electronic signal 134 to be sent to the control circuit 106 from the electronic communication network 114.

In still another example, usage of a service 116 or device 118 on the electronic communication network 114 causes a fourth electronic signal 136 to be sent to the control circuit 106 from the electronic communication network 114.

In yet another example, when a failure notice is received from the financial institution, the control circuit 106 sends a fifth electronic signal 138 that is effective to deactivate an electronic device or service on the electronic communication network. In these cases, when the financial institution 112 rejects the second authorization request, the financial institution 112 creates the failure notice, and then the failure notice is received by the control circuit 106 from the financial institution 112.

In some examples, occurrence of the triggering event is random and unpredictable in time. In other examples, occurrence of the triggering event is predetermined in time.

In some aspects, historical data is analyzed by the control circuit 106 and automatically used to selectively initiate authorization requests before a predetermined triggering event occurs. For example, historical data may be analyzed to see when a customer typically orders products. The historical data may indicate customer purchases (e.g., the content, time, frequency, and/or amount of these purchases). The control circuit 106 might anticipate a customer's purchase and initiate authorization requests a certain number of days before these requests are likely to occur where the number of days is determined by an analysis of the historical data. In still another example, the customer may have a re-occurring order and authorization requests may be sent by the control circuit 106 to the financial institution 112 in anticipation of the order. In aspects, historical data analysis might include analyzing the purchase history of a particular customer but also might include analyzing the purchase history of a larger group of customers.

In other aspects, historical data is analyzed by the control circuit 106 and an authorization is selectively cancelled. For example, if shipment does not occur within a predicted 3 days as determined by the control circuit 106, then a reservation for a product that includes payment capture of when the product is shipped may be cancelled, thereby freeing credit on the credit card.

Figure 2:
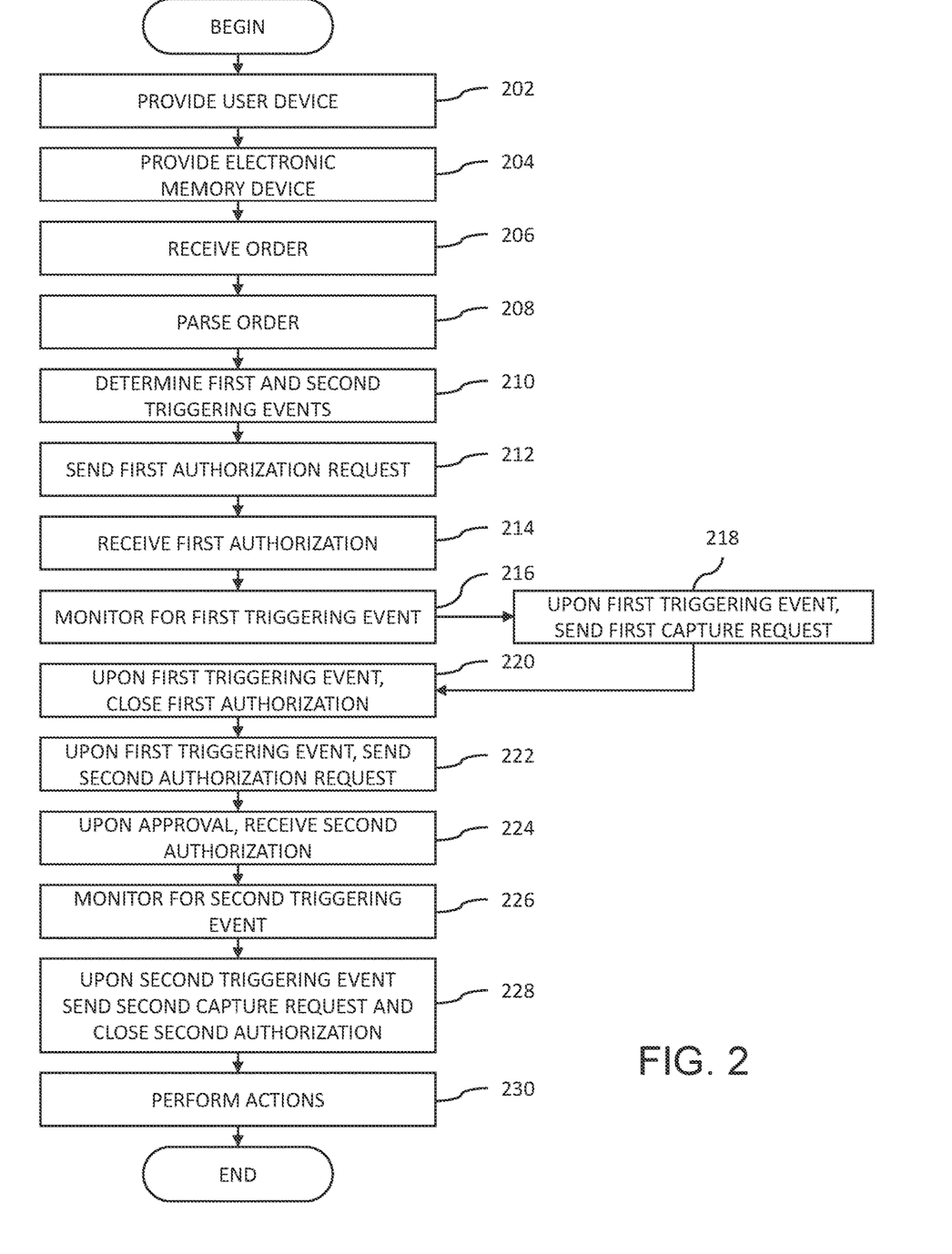
FIG. 2 comprises a flowchart of an approach according to various embodiments of the present invention.

Referring now to FIG. 2, one example of an approach for billing authorization is described. It will be appreciated that the example of FIG. 2 includes an order with two items. However, the approach described in FIG. 2 can be extended to orders with any number of items or services.

At step 202, a user electronic device is provided. The user electronic device is configured to accept a customer order. The customer order includes a first item and a second item. In examples, the user electronic device is a smart phone, lap top, tablet, or cellular phone. Other examples are possible. The order may be an electronic order that is entered by the user at a customer interface at the user electronic device. The form or format of the order may be of any format or structure, or follow any type of protocol.

At step 204, an electronic memory device is provided. The electronic memory device may be any type of memory device that stores information. The electronic memory device stores a policy and the policy maps item or service types to triggering events. In one example, the policy is structured as a mapping table data structure where the types are mapped to triggering events. One purpose of the policy is to map the types of items or services in the order to triggering events. In one specific example, a phone case (item type) may be mapped to a shipment (triggering event). In another example, a voice mail service (service type) is mapped to activation of the service (triggering event).

At step 206 and at a control circuit, the order is received from the customer via the user electronic device. The user electronic device may have transmitted the order to the control circuit via one or more electronic communication networks.

At step 208 and at the control circuit, the order is parsed to determine the first item and the second item, and a determination is made of a first item type for the first item and a second item type for the second item. By "parsing," it is meant that the items or services in the order, the price of these items or services, and potentially other information concerning the order and/or other items in the order are determined. Various approaches known to those skilled in the art can be used to examine the order and determine this information.

At step 210 and at the control circuit, a first triggering event is determined for the first item type and a second triggering event is determined for the second item type by applying the first item type and the second item type to the policy. To use the examples mentioned above, a phone case (item type) may be mapped to a shipment (triggering event). In another example, a voice mail service (service type) is mapped to activation of the service (triggering event). Other examples are possible. By "applying," it is meant that the item type is entered into the policy to produce a result (i.e., the triggering event). In this particular example, application of an item type to the mapping table involves first finding the item type in the table and then the corresponding triggering event linked to the item type.

At step 212, at the control circuit, and subsequent to receipt of the order, a first authorization request is sent to a financial institution. The first authorization request includes an initial amount, and the initial amount includes a cost of the first item and a cost of the second item. The first authorization request (and any authorization request described herein) may be any electronic message or communication following and type of format or protocol that includes an amount (a value in currency units such as dollars).

Subsequently at step 214, a first authorization is received from the financial institution for the first amount and the second amount, and the first authorization includes a first authorization identifier. The first authorization (and any authorization described herein) may be any electronic message or communication following and type of format or protocol that includes an authorization amount (a value in currency units such as dollars), authorization identifier, and/or other information.

At step 216, at the control circuit, and subsequent to receiving the first authorization, monitoring occurs for the occurrence of the first triggering event. The control circuit may monitor for receipt of predetermined control signals (e.g., from particular sources having specific types of information). In other aspects, the control circuit may be coupled to sensors that monitor for predetermined events (e.g., actuation or deactivation of devices).

At step 218 and upon detection of the occurrence of the first triggering event, a first capture request is sent to the financial institution to capture funds for the first item. Capturing funds includes all steps needed to transfer funds from a first entity (e.g., the customer) to a subsequent entity (the credit card company) and may involve an exchange of electronic messages having appropriate electronic security protection.

At step 220 and upon the detection occurrence of the first triggering event, the first authorization is closed. Closing the authorization may include deleting the authorization and/or indicating that authorization is no longer usable.

At step 222 and upon the detection of the occurrence of the first triggering event, a second authorization request is sent to the financial institution. The second authorization request is for the initial amount minus the cost of the first item.

At step 224, at the control circuit, and when the financial institution approves the second authorization request a second authorization is received. The second authorization is received from the financial institution. The second authorization includes a second authorization identifier and includes the cost of the second item.

At step 226 and at the control circuit, monitoring for the occurrence of the second triggering event occurs. As mentioned, monitoring may include determining whether messages from particular sources or having particular content have arrived.

At step 228 and upon detection of the occurrence of the second triggering event, a second capture request is sent to the financial institution to capture the funds for the second item and the second authorization is closed.

At step 230, one or more actions occur after the order is received. These actions can occur at various locations and, as mentioned, can happen any time after the order is received by the control circuit. The one or more actions can include: shipment of a product from a storage site causes a first electronic signal to be sent to the control circuit, the first electronic signal indicating the shipment has occurred; download of digital content or computer software from an electronic memory storage device causes a second electronic signal to be sent to the control circuit, the first electronic signal indicating the shipment has occurred; activation of a service on an electronic communication network causes a third electronic signal to be sent to the control circuit from the electronic communication network; usage of a service on the electronic communication network causes a fourth electronic signal to be sent to the control circuit from the electronic communication network; or when a failure notice is received from the financial institution, the control circuit sends a fifth electronic signal effective to deactivate an electronic device or service on the electronic communication network. Other examples of actions are possible.

As mentioned, the shipment of a product from a storage site causes a first electronic signal to be sent to the control circuit. The shipment involves the physical transfer of one or more products from the storage site to a destination site. The shipper may create the first control signal.

As also mentioned, the download of digital content or computer software from an electronic memory storage device causes a second electronic signal to be sent to the control circuit. The download involves the actual physical transmission of data, code, instructions, and/or other electronic components representing the digital content or computer software. The second control signal may be created at the download source.

Additionally as mentioned, activation of a service on an electronic communication network causes a third electronic signal to be sent to the control circuit from the electronic communication network. For example, a customer may activate a service at a device by entering a password causing the service to be active and thereby creating the second control signal at the device.

Also as mentioned, usage of a service on the electronic communication network causes a fourth electronic signal to be sent to the control circuit from the electronic communication network, For example, a user may press a key on a device indicating usage of a service that creates the fourth control signal. Transfer of various data and/or information may also result in the creation of the fourth control signal to give another example.

Further as mentioned, when a failure notice is received from the financial institution, the control circuit sends a fifth electronic signal effective to deactivate an electronic device or service on the electronic communication network. The deactivation signal physically interacts with components of the network and/or devices. For example, the fifth electronic signal may turn electronic switches, deactivate electronic components, and/or activate other electronic components or devices.

It will be appreciated that all of these actions involve the physical transformation, movement, and/or transfer of objects, Moreover these actions take place within a specific physical structure and involve the physical interaction of various elements with and within this structure.

Figure 3:
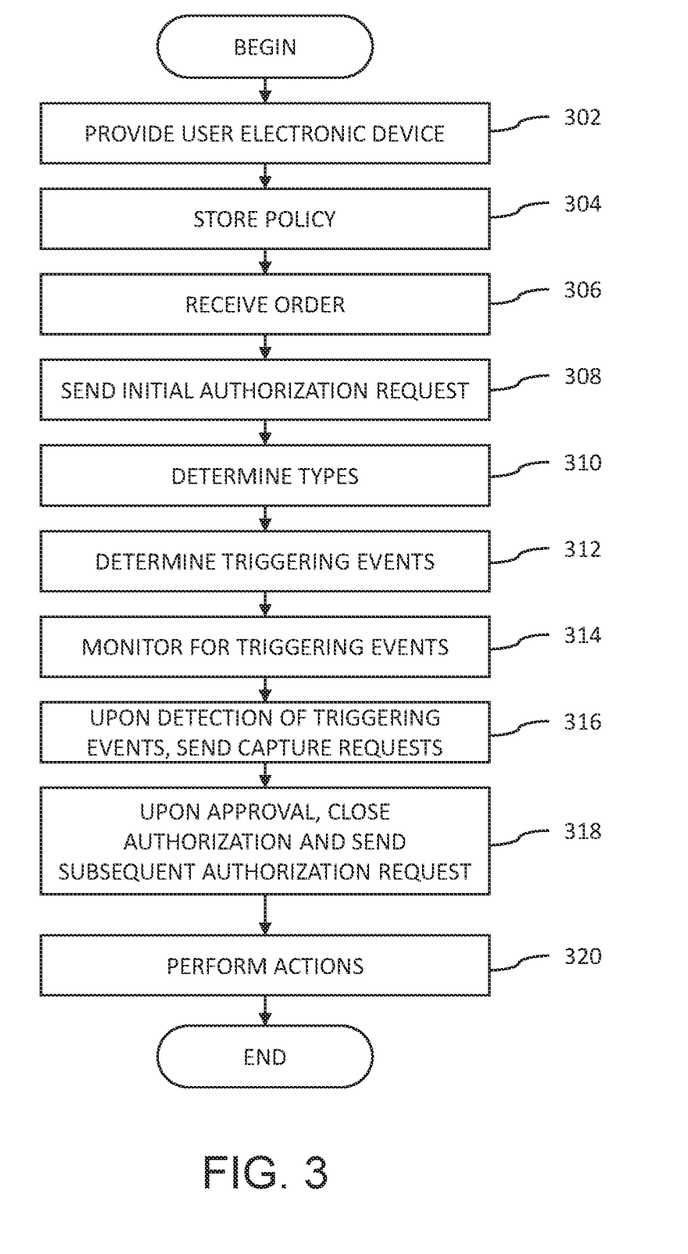
FIG. 3 comprises flowchart illustrating aspects of the operation of the approaches described herein according to various embodiments of the present invention.

Referring now to FIG. 3, another example of an approach for billing authorization is described. It will be appreciated that the example of FIG. 3 is one example and other examples are possible. The description of similar steps with respect to FIG. 2 will also apply to similar steps described with respect to FIG. 3.

At step 302, a user electronic device is provided. The user device is configured to accept a customer order, and the customer order including a plurality of items.

At step 304, a policy is stored in an electronic memory device. The policy maps item types to triggering events.

At step 306, a control circuit receives the order from the customer via the user electronic device and parse the order to determine each of the plurality of items in the order.

At step 308, the control circuit, upon receipt of the order, sends an initial authorization request to the financial institution. The initial authorization request has a total initial authorization amount that includes a cost of all items in the order, and responsively receive an initial authorization with an initial authorization identifier.

At step 310, the control circuit determines a type for each of the items in the order. This step may include analyzing the parsed information for determining the type of an item. For example, the approach may determine key words (e.g., "voice"), which may be linked to types (e.g., "voice mail service").

At step 312, the control circuit, for each of the plurality of items in the order, determines a triggering event by applying the determined type of item to the policy. The triggering events may include a number of different events. The events may involve actuation or de-actuation of devices or services, pressing of keys or other switches, or the movement (e.g., shipment) of products to mention a few examples. In some examples, occurrence of the triggering event is random and/or unpredictable in time. In other examples, occurrence of the triggering event is predetermined in time (e.g., occurs every 3 days).

At step 314, the control circuit subsequently monitors for the occurrence of each of the determined triggering events.

At step 316 and upon detection of the occurrence of each of the determined triggering events associated with each item in the order, the control circuit sends a request to the financial institution to capture the cost for the item associated with the triggering event.

At step 318, the control circuit, when the financial institution approves the capture request, closes any existing authorization associated with the order; sends a subsequent authorization request to the financial institution, the subsequent authorization request having a subsequent authorization amount that excludes a cost of the item associated with the triggering event; and when the financial institution approves the subsequent authorization request, receives a subsequent authorization identifier from the financial institution in response to the subsequent authorization request.

In some aspects, historical data is analyzed by the control circuit and automatically used to selectively initiate authorization requests before a predetermined triggering event occurs. In other aspects, historical data is analyzed by the control circuit and an authorization request is selectively cancelled.

At step 320, one or more actions occur after the order is received. The one or more actions can include a number of forms and types. For example, the actions may be: shipment of a product from a storage site causes a first electronic signal to be sent to the control circuit, the first electronic signal indicating the shipment has occurred; download of digital content or computer software from an electronic memory storage device causes a second electronic signal to be sent to the control circuit, the first electronic signal indicating the shipment has occurred; activation of a service on an electronic communication network causes a third electronic signal to be sent to the control circuit from the electronic communication network; usage of a service on the electronic communication network causes a fourth electronic signal to be sent to the control circuit from the electronic communication network; or when a failure notice is received from the financial institution, the control circuit sends a fifth electronic signal effective to deactivate an electronic device or service on the electronic communication network. In some examples, the electronic device is a sensor. In other examples, the electronic device is an Internet of Things (IoT) device.

Figure 4:
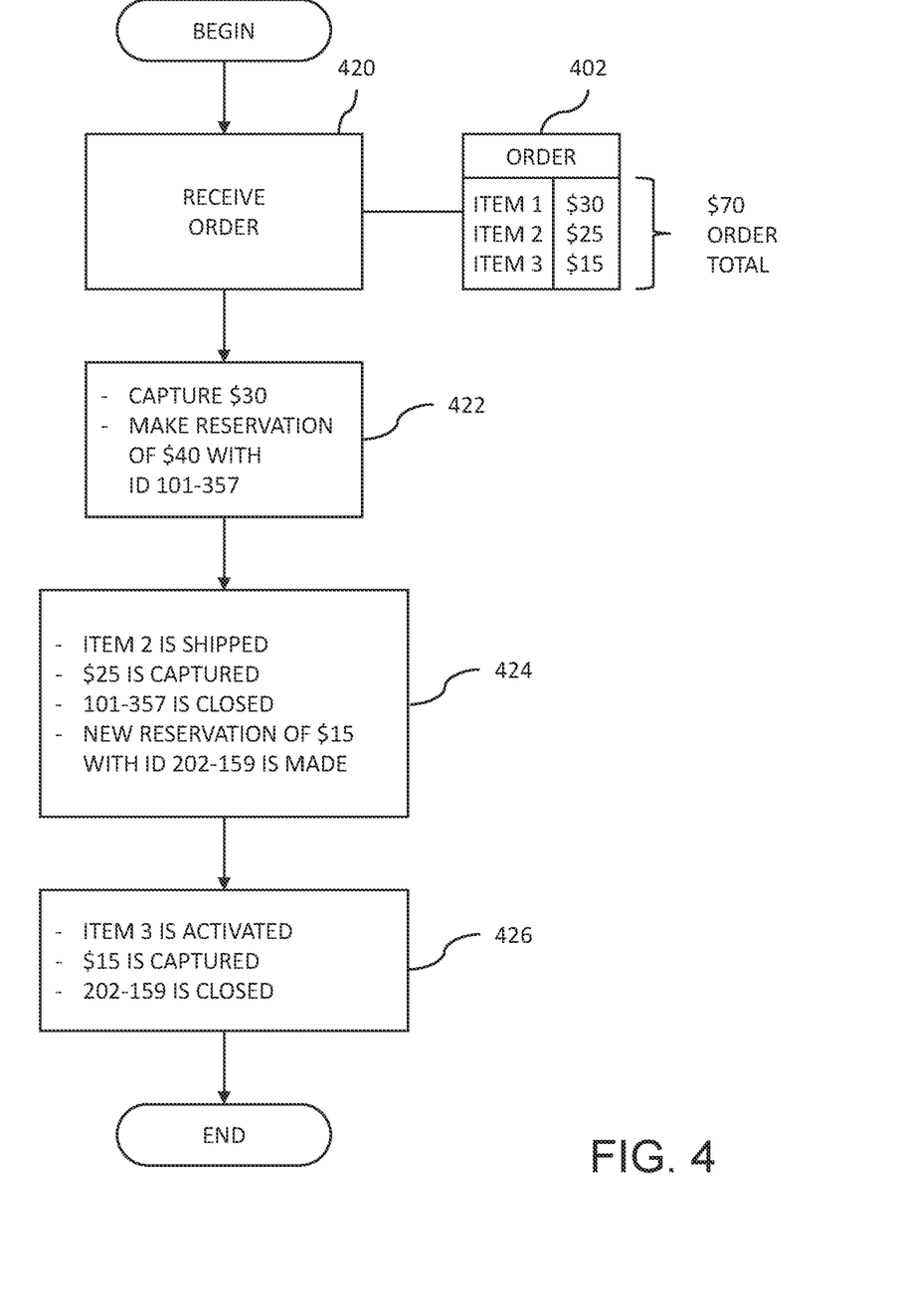
FIG. 4 comprises flowchart illustrating aspects of the operation of the approaches described herein according to various embodiments of the present invention.

Referring now to FIG. 4, one example of an approach for making electronic payments is described. It will be appreciated that FIG. 4 describes one example of the implementation of the approaches described herein and that other examples are possible.

An order 402 is received at step 420 and includes items 1, 2, and 3. Payment capture is to occur at three different times and based upon the occurrence of three dynamic, different, and unpredictable events: for item 1, capture occurs when the order is received; for item 2, capture occurs when the item is shipped; and for item 3, capture occurs when the customer activates a particular service. As will be appreciated, these events are dynamic and changeable. For instance, the event for item 2 (shipment) may occur earlier during some weeks than the event for item 3 (customer activation), but later on other weeks. A policy 404 maps item types to triggering events and the policy is applied to the order at step 420 to determine the triggering events that are automatically (without human intervention) monitored.

In more detail, the overall order total is $70 and item 1 costs $30, item 2 costs $25, and item 3 costs $15. At step 422, $30 is captured on the credit card of the customer and the overall reservation amount of $40 ($70-$30) with ID 101-357 is made with the financial institution. Reservations are made by sending an authorization request to the financial institution for a certain amount, and receiving an authorization (and identifier) that approves this amount. Payment capture involves sending electronic communications to one or more financial institutions to capture funds from a customer where the funds may be transferred from the customer (or the customer's bank) to another entity (such as a business or another financial institution).

Then, at step 424, item 2 (which costs $25) is shipped three weeks later. At step 424, the $25 is captured against the credit card, reservation 101-357 is closed, and a new reservation of $15 ($40-$25) with ID 202-159 is made with the financial institution. Again, reservations are made by sending an authorization request to the financial institution for a certain amount, and receiving an authorization (and identifier) that approves this amount. Payment capture involves sending electronic communications to one or more financial institutions to capture funds from a customer where the funds may be transferred from the customer (or the customer's bank) to another entity (such as a business or another financial institution).

At step 426 and one day later, the customer activates their service and also at step 426 the final $15 is charged and captured, and the last reservation (with ID 202-159) is closed.

As can be seen, the reservations change as asynchronous, dynamic, and unpredictable events occur. In aspects, the period between events is also unknown and unpredictable.

Other aspects of these approaches include the ability to analyze historic data and automatically initiate reservations before an event is predicted to occur. For example, if shipments historically occur three days after an order is reserved, a reservation can be made automatically three days after the order is received. Based upon historic data, reservations can also be cancelled. For example, if shipment does not occur within the predicted 3 days, then a reservation for a product that includes payment capture when the product is shipped may be cancelled, thereby freeing credit on the credit card.

Figure 5:
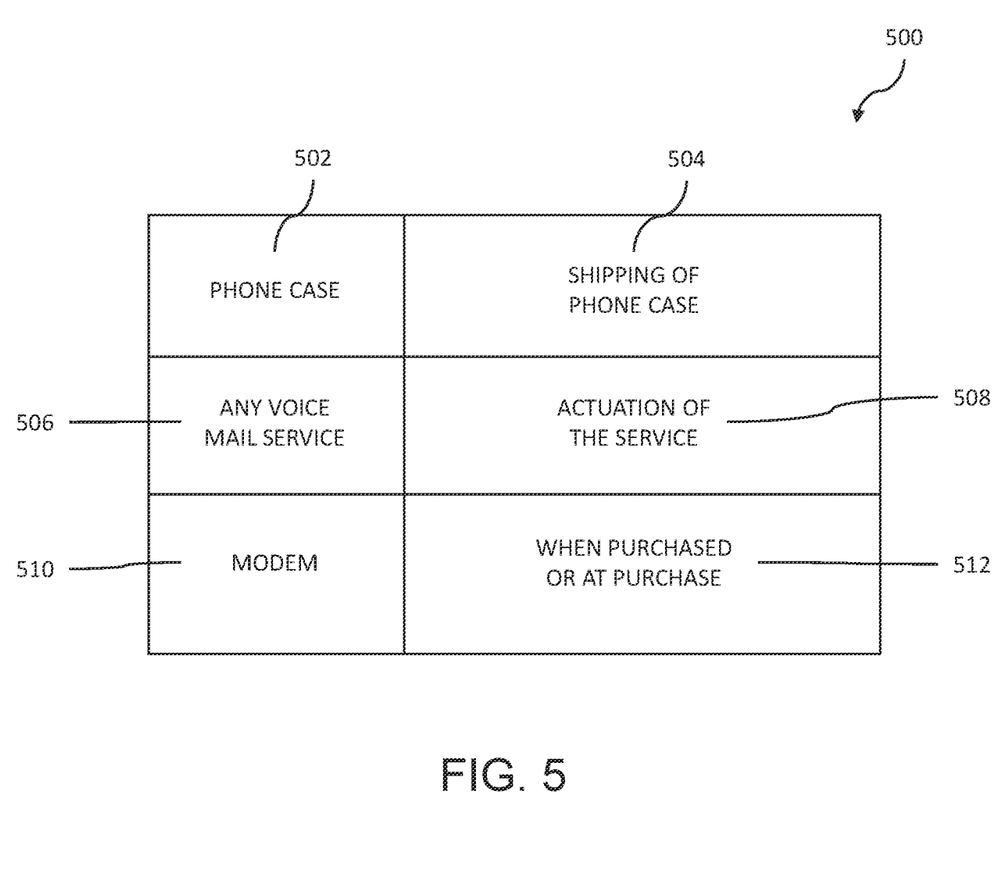
FIG. 5 comprises diagram illustrating aspects of the operation of the approaches described herein according to various embodiments of the present invention.

Referring now to FIG. 5, one example of a policy is described. In this example, the policy is shown as being implemented as a mapping table 500. The table 500 has rows, with each row having a type in a first column and a triggering event in the second column. It will be appreciated that these are examples only and that other examples are possible. As described elsewhere herein, the types are determined by a control circuit parsing and analyzing items and/or services in an electronic (or potentially paper) order and based upon this, assigning a type. The triggering events are assigned to a type, for example, by a user or administrator entering the information into the table 500. In other aspects, assignment may be automatic or automated (e.g., a machine learning program may be used to determine and assign triggering events).

As shown in the table 500, a first type 502 is "phone case." The "phone case" type maps to an event 504 that is "shipping of the phone case."

A second type 506 is "any voice mail service." The corresponding event 508 is "actuation of the service."

A third type 510 is a "modem." The corresponding event 512 is "when purchased or at purchase."

It will be appreciated that only three examples are shown and that other types and triggering events can be included. It will be understood that the mapping table 500 and its entries can be dynamically changed as needed, for example, to react to changing market conditions or as technology changes.

In operation and once the table 500 is created, a control circuit determines items or services in an order, maps these to a type, and then applies the type to a triggering event. Once all items of the order have been mapped to triggering events, the control circuit can monitor for the occurrence of the event. Once an event is detected, then the control circuit can take the various actions as has been described elsewhere herein.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system, the system comprising:
a user electronic device, the user electronic device being configured to accept a customer order, the customer order including a first item and a second item;
an electronic memory device, the electronic memory device storing a policy, the policy mapping item types to triggering events;
a control circuit, the control circuit being coupled to the user electronic device and the electronic memory device, the control circuit being configured to:
receive the order from the customer via the user electronic device;
parse the order to determine the first item and the second item, and determine a first item type for the first item and a second item type for the second item;
determine a first triggering event for the first item type and a second triggering event for the second item type by applying the first item type and the second item type to the policy;
subsequent to receipt of the order, send a first authorization request to a financial institution, the first authorization request including an initial amount, the initial amount including a cost of the first item and a cost of the second item, and subsequently receiving a first authorization from the financial institution for the first amount and the second amount, the first authorization including a first authorization identifier;
subsequent to receiving the first authorization, monitor for the occurrence of the first triggering event and upon detection of the occurrence of the first triggering event:
send a first capture request to the financial institution to capture the funds for the first item;
close the first authorization;
send a second authorization request to the financial institution, the second authorization request being for the initial amount minus the cost of the first item;
when the financial institution approves the second authorization request:
receive a second authorization, the second authorization including a second authorization identifier and including the cost of the second item;
subsequently monitor for the occurrence of the second triggering event and upon detection of the occurrence of the second triggering event:
send a second capture request to the financial institution to capture the funds for the second item;
close the second authorization;
wherein one or more actions occur after the order is received, the one or more actions being:
shipment of a product from a storage site causes a first electronic signal to be sent to the control circuit, the first electronic signal indicating the shipment has occurred;
download of digital content or computer software from an electronic memory storage device causes a second electronic signal to be sent to the control circuit, the second electronic signal indicating the download has occurred;
activation of a service on an electronic communication network causes a third electronic signal to be sent to the control circuit from the electronic communication network;
usage of a service on the electronic communication network causes a fourth electronic signal to be sent to the control circuit from the electronic communication network; or
when a failure notice is received from the financial institution, the control circuit sends a fifth electronic signal effective to deactivate an electronic device or service on the electronic communication network.

2. The system of claim 1, wherein occurrence of the triggering event is random and unpredictable in time.

3. The system of claim 1, wherein occurrence of the triggering event is predetermined in time.

4. The system of claim 1, wherein the user electronic device is a laptop, personal computer, smartphone, or tablet.

5. The system of claim 1, wherein when the financial institution rejects the second authorization request, the failure notice is received from the financial institution.

6. The system of claim 1, wherein historical data is analyzed by the control circuit and automatically used to selectively initiate authorization requests before a predetermined triggering event occurs.

7. The system of claim 1, wherein historical data is analyzed by the control circuit and an authorization request is selectively cancelled.

8. The system of claim 1, wherein the order includes one or more of an order for an electronic device or an order for a service.

9. The system of claim 1, wherein the electronic device is a sensor.

10. The system of claim 1, wherein the electronic device is an Internet of Things (IoT) device.

11. The system of claim 1, wherein the policy is dynamic and can be changed over time.

12. A method, the method comprising:
providing a user electronic device, the user electronic device being configured to accept a customer order, the customer order including a first item and a second item;
providing an electronic memory device, the electronic memory device storing a policy, the policy mapping item types to triggering events;
at a control circuit, receiving the order from the customer via the user electronic device;
at the control circuit, parsing the order to determine the first item and the second item, and determining a first item type for the first item and a second item type for the second item;
at the control circuit, determining a first triggering event for the first item type and a second triggering event for the second item type by applying the first item type and the second item type to the policy;
at the control circuit and subsequent to receipt of the order, sending a first authorization request to a financial institution, the first authorization request including an initial amount, the initial amount including a cost of the first item and a cost of the second item, and subsequently receiving a first authorization from the financial institution for the first amount and the second amount, the first authorization including a first authorization identifier;
at the control circuit and subsequent to receiving the first authorization, monitoring for the occurrence of the first triggering event and upon detection of the occurrence of the first triggering event:
sending a first capture request to the financial institution to capture the funds for the first item;
closing the first authorization;
sending a second authorization request to the financial institution, the second authorization request being for the initial amount minus the cost of the first item;
at the control circuit and when the financial institution approves the second authorization request:
receiving a second authorization, the second authorization including a second authorization identifier and including the cost of the second item;
at the control circuit, subsequently monitoring for the occurrence of the second triggering event and upon detection of the occurrence of the second triggering event:
sending a second capture request to the financial institution to capture the funds for the second item;
closing the second authorization;
wherein one or more actions occur after the order is received, the one or more actions being:

shipment of a product from a storage site causes a first electronic signal to be sent to the control circuit, the first electronic signal indicating the shipment has occurred;
download of digital content or computer software from an electronic memory storage device causes a second electronic signal to be sent to the control circuit, the second electronic signal indicating the download has occurred;
activation of a service on an electronic communication network causes a third electronic signal to be sent to the control circuit from the electronic communication network;
usage of a service on the electronic communication network causes a fourth electronic signal to be sent to the control circuit from the electronic communication network; or
when a failure notice is received from the financial institution, the control circuit sends a fifth electronic signal effective to deactivate an electronic device or service on the electronic communication network.

13. The method of claim 12, wherein occurrence of the triggering event is random and unpredictable in time.

14. The method of claim 12, wherein occurrence of the triggering event is predetermined in time.

15. The method of claim 12, wherein the user electronic device is a laptop, personal computer, smartphone, or tablet.

16. The method of claim 12, wherein when the financial institution rejects the second authorization request, the failure notice is received from the financial institution.

17. The method of claim 12, wherein historical data is analyzed by the control circuit and automatically used to selectively initiate authorization requests before a predetermined triggering event occurs.

18. The method of claim 12, wherein historical data is analyzed by the control circuit and an authorization request is selectively cancelled.

19. The method of claim 12, wherein the order includes one or more of an order for an electronic device or an order for a service.

20. The method of claim 12, wherein the electronic device is a sensor.

21. The method of claim 12, wherein the electronic device is an Internet of Things (IoT) device.

22. The method of claim 12, wherein the policy is dynamic and can be changed over time.

23. A system, the system comprising:
a user electronic device, the user electronic device being configured to accept a customer order, the customer order including a plurality of items;
an electronic memory device, the electronic memory device storing a policy, the policy mapping item types to triggering events;
a control circuit, the control circuit being coupled to the user electronic device and the electronic memory device, the control circuit being configured to:
receive the order from the customer via the user electronic device;
parse the order to determine each of the plurality of items in the order;
upon receipt of the order, send an initial authorization request to the financial institution, the initial authorization request having a total initial authorization amount that includes a cost of all items in the order, and responsively receiving an initial authorization with an initial authorization identifier;

for each of the plurality of items in the order, determine a type for each of the items;

for each of the plurality of items in the order, determine a triggering event by applying the determined type of item to the policy;

subsequently monitor for the occurrence of each of the determined triggering events and upon detection of the occurrence of each of the determined triggering events associated with each item in the order:

send a request to the financial institution to capture the cost for the item associated with the triggering event, and when the financial institution approves the capture request, close any existing authorization associated with the order;

send a subsequent authorization request to the financial institution, the subsequent authorization request having a subsequent authorization amount that excludes a cost of the item associated with the triggering event;

when the financial institution approves the subsequent authorization request, receive a subsequent authorization identifier in response to the subsequent authorization request;

wherein one or more actions occur after the order is received, the one or more actions being:

shipment of a product from a storage site causes a first electronic signal to be sent to the control circuit, the first electronic signal indicating the shipment has occurred;

download of digital content or computer software from an electronic memory storage device causes a second electronic signal to be sent to the control circuit, the second electronic signal indicating the download has occurred;

activation of a service on an electronic communication network causes a third electronic signal to be sent to the control circuit from the electronic communication network;

usage of a service on the electronic communication network causes a fourth electronic signal to be sent to the control circuit from the electronic communication network; or when a failure notice is received from the financial institution, the control circuit sends a fifth electronic signal effective to deactivate an electronic device or service on the electronic communication network.

24. The system of claim 23, wherein occurrence of the triggering event is random and unpredictable in time.

25. The system of claim 23, wherein occurrence of the triggering event is predetermined in time.

26. The system of claim 23, wherein historical data is analyzed by the control circuit and automatically used to selectively initiate authorization requests before a predetermined triggering event occurs.

27. The system of claim 23, wherein historical data is analyzed by the control circuit and an authorization request is selectively cancelled.

28. The system of claim 23, wherein the electronic device is a sensor.

29. The system of claim 23, wherein the electronic device is an Internet of Things (IoT) device.

* * * * *